April 12, 1949.  R. A. MILLER  2,467,269
FISHING PLUG RETRIEVER
Filed Aug. 19, 1947

R. A. Miller
INVENTOR
BY *Snow*
ATTORNEYS.

Patented Apr. 12, 1949

2,467,269

UNITED STATES PATENT OFFICE 2,467,269

FISHING PLUG RETRIEVER

Robert Arthur Miller, Knoxville, Tenn.

Application August 19, 1947, Serial No. 769,424

1 Claim. (Cl. 43—30)

By way of explanation, it might be stated that when fishing with artificial bait or lures, the fisherman usually uses reels and a line wound on the reel, the fisherman casting the fishing plug or artificial bait and then the fishing plug or artificial bait is drawn in by slowly winding the line on the reel.

It frequently happens that the plug or artificial bait becomes hung on obstructions, such as rocks, logs or the like, and the purpose of the present invention is to provide means for dislodging the plug or artificial bait from the foreign matter or article holding the same.

An important object of the invention is to provide a retrieving device embodying a plurality of telescoping sections which may be dismantled and carried as a small and compact article.

An important object of the invention is to provide a device of this character to which the line may be connected, and the device moved along the line to contact with the hook to cause the hook to be dislodged, when pressure is directed to the device.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing

Figure 1 is a perspective view illustrating the use of the device as a means for retrieving and dislodging hooks from rocks or the like.

Figure 2:
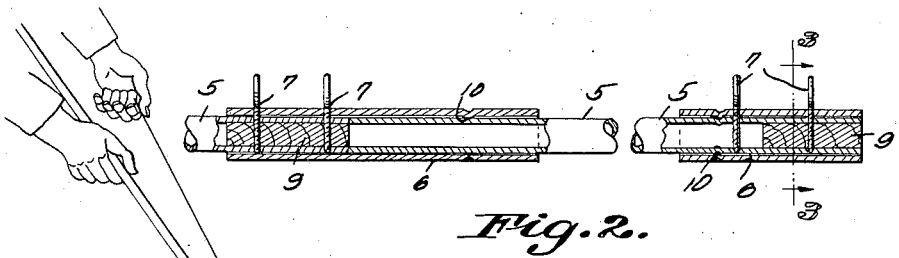
Figure 2 is a fragmental sectional view through one form of the invention.

Referring to the drawing in detail, the device comprises a plurality of telescoping sections 5, the sections being tubular and provided at one of their respective ends, with a sleeve 6, the sleeve being provided with openings to receive the screw eyes 7, which screw eyes are slightly open, providing a space 8 through which a fishing line may be threaded into the screw eyes.

In order to hold these screw eyes in position, wooden plugs 9 are positioned in the tubular sections 5, and the screw eyes are screwed into these plugs. The plugs not only provide means for securing the screw eyes to the metal tubular sections, but at the same time add rigidity to the tubular sections at their points of connection.

As clearly shown by Figure 2 of the drawing, the sleeves 6 are formed with inwardly extended bosses 10 that are adapted to frictionally engage the adjacent tubular section 5 which is fitted within the sleeve, to connect adjacent sections. These sections are identical in construction and any number of sections may be used in making up a retrieving device as described.

Figure 4:
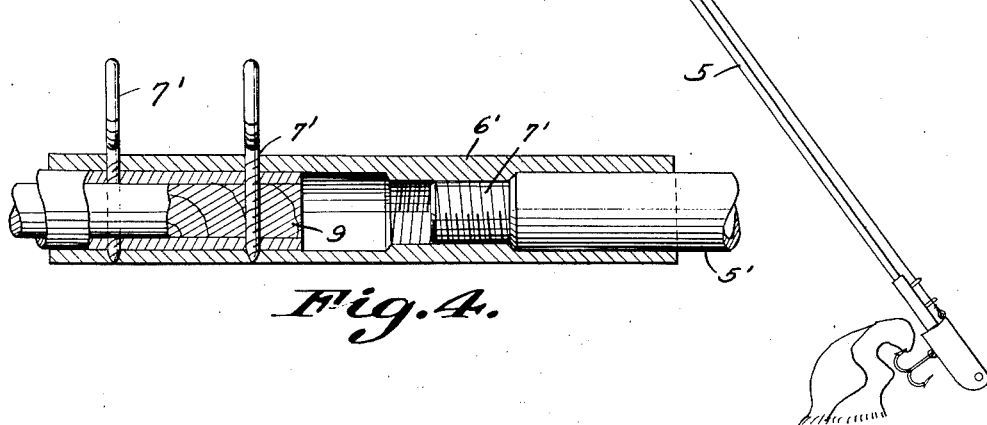
Figure 4 is a fragmental sectional view taken longitudinally through a modified form of the invention.

In the form of the invention as shown by Figure 4 of the drawing, the reference character 5' indicates tubular sections, each of which is provided with a sleeve 6', the sleeves 6' being formed with threaded openings to receive the threaded ends 7' of the adjacent tubular section 5' to connect the tubular sections.

In this form of the invention, the sleeves 6' are provided with wooden plugs 9' in which the screw eyes 7' are embedded, the screw eyes passing through openings in the sleeves 6' and through the openings in the tubular sections 5', provided for the reception of the screw eyes.

Figure 1:
Figure 3:
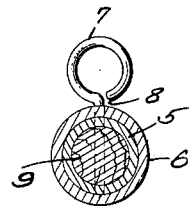
Figure 3 is a sectional view taken on line 3—3 of Figure 2.

In the use of the device, when a plug or artificial bait becomes hooked as indicated by Figure 1 of the drawing, the necessary sections of the retriever are connected in a manner as described, to provide a retriever of the proper length. The fishing line, which in the present showing is indicated by the reference character A, is threaded into the eyes of the screw eyes, and the retriever is forced downwardly along the fishing line A, until the end of the retriever engages the artificial bait or lure. The retriever is now forced against the artificial bait or lure moving it away from the obstruction on which the hooks of the artificial bait or lure, have become lodged.

The hooks may now be retrieved, without the danger of breaking the line and losing the artificial bait.

From the foregoing, it is believed that the operation and construction of applicant's retrieving device will be obvious, and that further description as to the construction and operation is unnecessary.

What is claimed is:

An artificial bait dislodging and retrieving device, comprising a body portion including a plurality of tubular sections, a plug extending into one end of each section, the sections being disposed end to end, sleeves removably secured over the adjacent ends of the sections, removably securing the sections together, and screw eyes extending through the sections, the threaded ends of the screw eyes being embedded in the plugs, said screw eyes being partially open whereby a fishing line may be positioned in the screw eyes, and the fishing line guiding the device to the hook end of the line for moving the hook end of the line away from an obstruction hooked by the fish hook of the line.

ROBERT ARTHUR MILLER.

REFERENCES CITED

The following references are of record in the file of this patent:

UNITED STATES PATENTS

| Number | Name | Date |
| --- | --- | --- |
| 863,606 | Hoerle et al. | Aug. 20, 1907 |
| 892,730 | Immell | July 7, 1908 |
| 1,851,370 | Munger | Mar. 29, 1932 |
| 2,316,500 | Bray | Apr. 13, 1943 |
| 2,365,414 | Kruse | Dec. 19, 1944 |